Figures 1, 2:
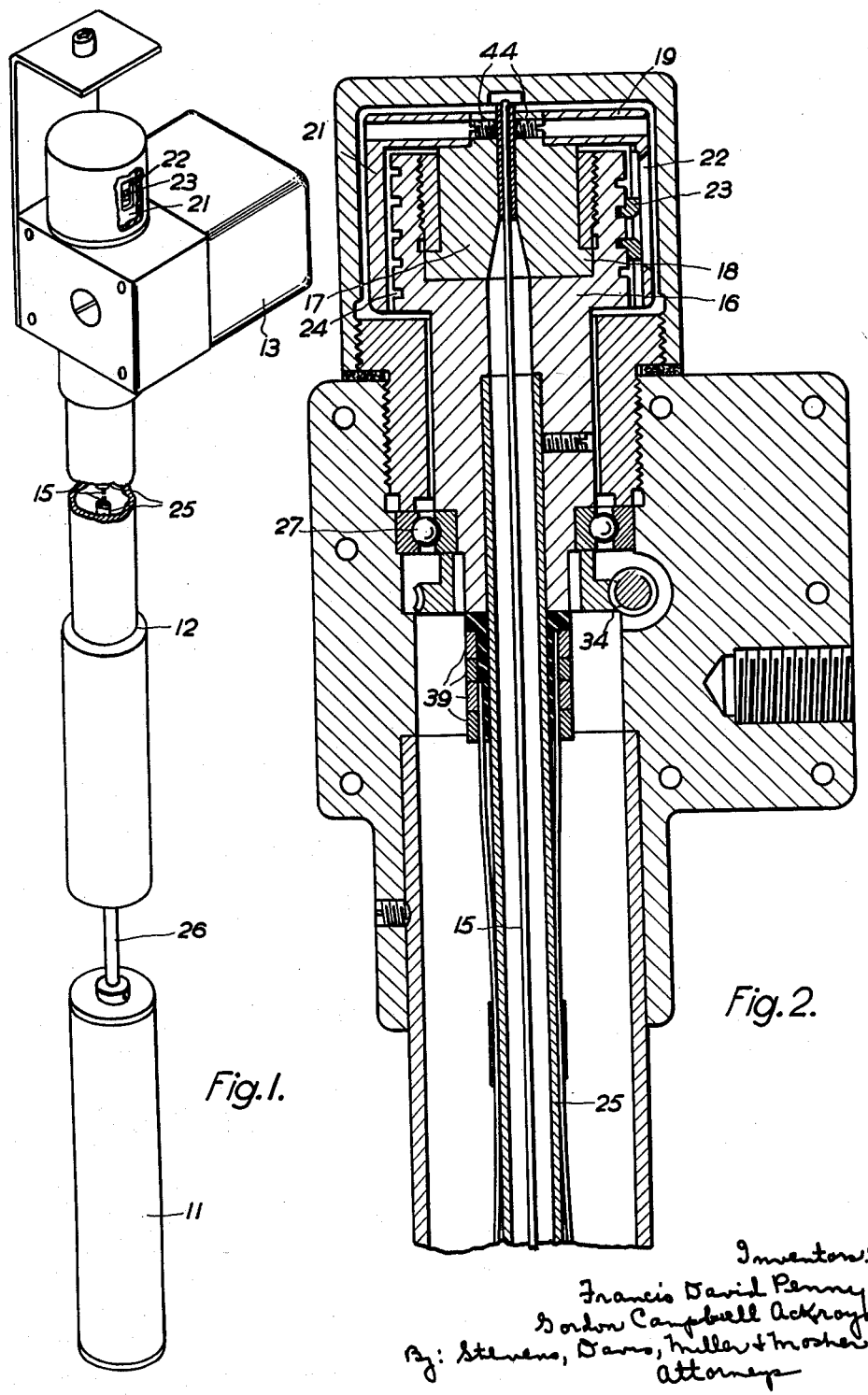

Oct. 25, 1960          F. D. PENNY ET AL          2,957,339
                          VISCOMETER
Filed March 17, 1958                          4 Sheets-Sheet 1

Oct. 25, 1960     F. D. PENNY ET AL     2,957,339

VISCOMETER

Filed March 17, 1958                                4 Sheets-Sheet 2

Oct. 25, 1960  F. D. PENNY ET AL  2,957,339
VISCOMETER

Filed March 17, 1958  4 Sheets-Sheet 3

Inventors:
Francis David Penny
Gordon Campbell Ackroyd
By: Stevens, Davis, Miller & Mosher
Attorneys

United States Patent Office 2,957,339
Patented Oct. 25, 1960

2,957,339

VISCOMETER

Francis David Penny, Sevenoaks, and Gordon Campbell Ackroyd, London, England (both of The Fuel Research Station, River Way, East Greenwich, London SE. 10, England)

Filed Mar. 17, 1958, Ser. No. 721,887

Claims priority, application Great Britain Mar. 22, 1957

12 Claims. (Cl. 73—59)

This invention relates to viscometers of the constant-torque rotating-body type and its object is to provide a viscometer of robust construction which can be used to measure the viscosity of a liquid in a storage tank.

Since the viscometer according to the invention is of the constant torque type, the viscosity measurement is a function of the speed of rotation of the immersion body. To maintain the torque the invention provides a torsion member connected between the immersion body and a torsion head rotatably mounted within a stationary support, a motor being provided for rotating the torsion head in a direction to increase the torque in the torsion member and the motor being controlled by relative rotation between the immersion body and the torsion head. It will be understood that a predetermined torque is applied to the torsion member before a test is commenced and that the control which at least slows down the motor when the immersion body lags behind, and speeds it up when the immersion body leads, causes the motor to wind up the torsion member at a mean rate equal to the rate of rotation of the immersion body. The control is arranged so that it is actuated by a relatively small rotation between the immersion body and the torsion head, while the predetermined torque is such as to require say two or three or even more complete revolutions of one end of the torsion member in relation to the other so that the fluctuations in torque due to the relative movements necessary to actuate the control are very small.

The control of the motor is most conveniently effected electrically, the relative rotation between the immersed body and the stationary support opening and closing contacts. The motor itself is also most conveniently electric. In addition to the motor control, contacts may be provided to actuate a counter which counts the number of revolutions of the immersed body, thus enabling its speed to be ascertained by counting the number of revolutions in a known period of time.

The invention will be further described with reference to the accompanying drawings which illustrate one preferred embodiment and also the electric circuits used.

Figure 3:
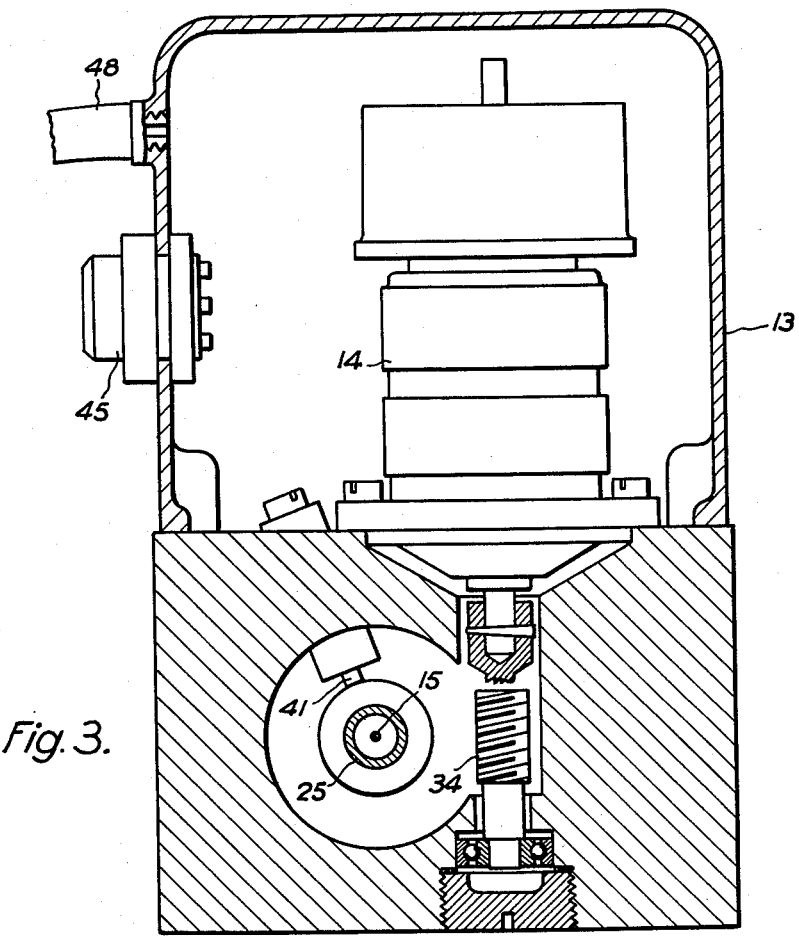
Figure 5:
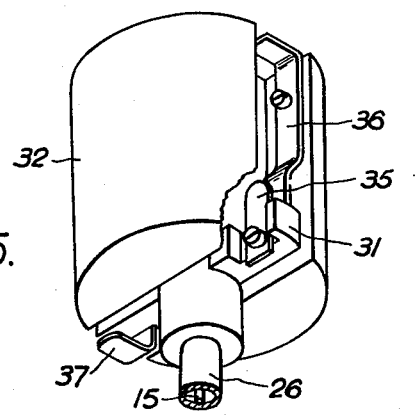
Figure 4:
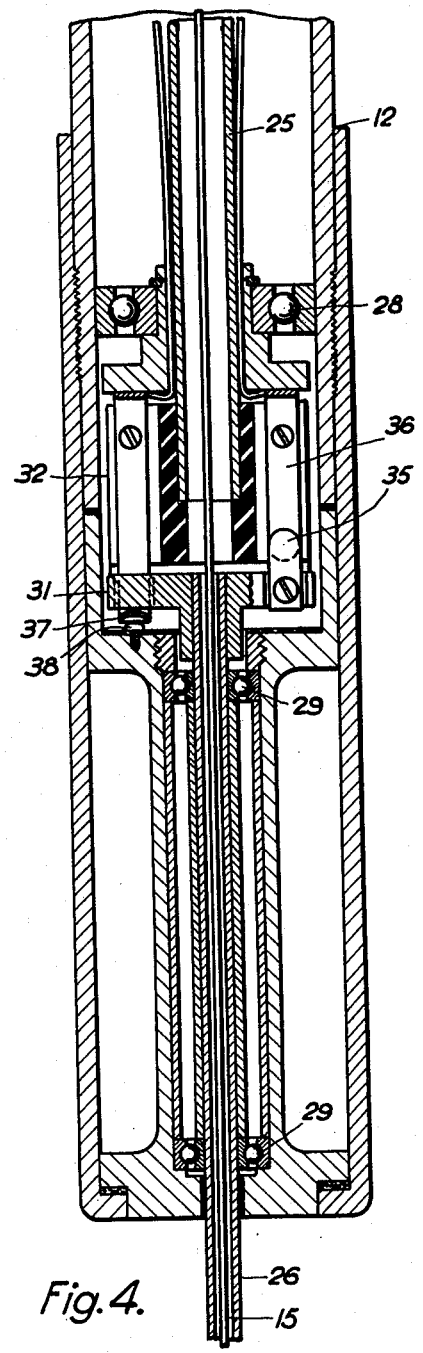
Figure 6:
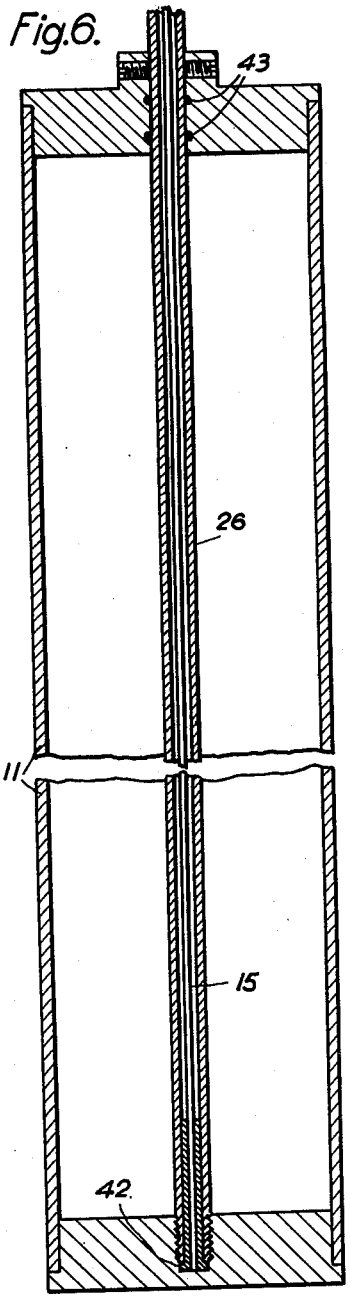
Figure 7:
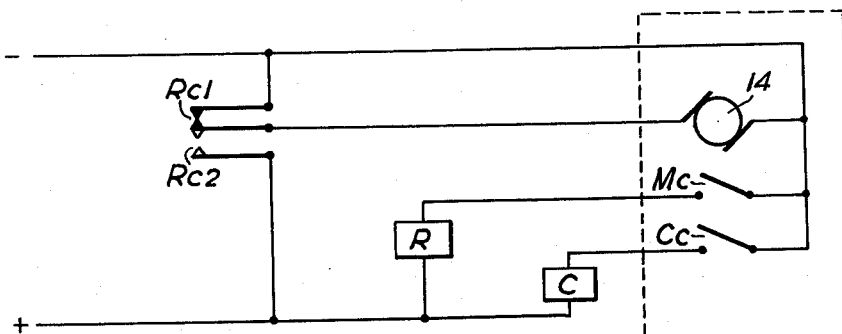
Figure 8:
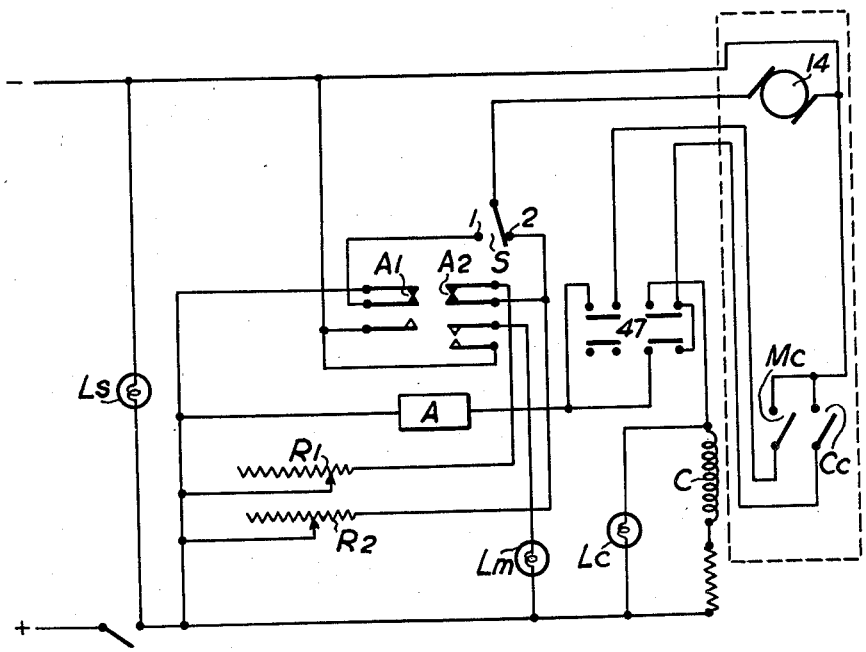

Figure 1 is a perspective view showing the immersion body, the support and associated parts, Figure 2 is an axial section of the torsion head, Figure 3 is a detail axial section at right angles to Figure 2, Figure 4 is an axial section of the control means, Figure 5 is a diagrammatic perspective view of part of the control means looking upwards, Figure 6 is an axial section of the immersion body, Figures 7 and 8 are circuit diagrams.

In the embodiment illustrated in Figures 1 to 6 the immersed body is a cylinder 11 having a length about five times its diameter. The stationary support 12 is also of tubular form of slightly greater diameter than the cylinder 11 with a casing 13 for a motor 14 and connections at the upper end. The cylinder 11 is spaced from the support 12 and the two are so-axially arranged. The torsion member is a stout wire 15, say of steel secured to the lower end of the cylinder as described below and at the upper end to a torsion head 16 journalled in the upper end of the support 12. To enable the predetermined torque to be applied the upper end of the wire is secured in a manner described below in a plug member 17 rotatably retained by a shoulder 18 in the end of the torsion head. To indicate and lock the adjustment the plug member 17 carries through an end disc 19, a sleeve 21 extending over the end of the torsion head 16, the sleeve carrying in an axial groove behind an axial window 22 a cursor 23 which engages in a helical groove 24 in the torsion head 16. Through the cursor is visible one of a series of indications marked on the periphery of the torsion head thereby indicating the amount of twist applied to the wire. During this operation rotation of the cylinder 11 must, of course, be prevented, but this is done by the control mechanism which will be described.

To provide for control a tubular shaft 25 surrounding the wire 15 extends from the torsion head 16 to near the lower end of the support 12 and another tubular shaft 26 surrounding the wire extends from the cylinder 11 into the support 12. The torsion head 16 and its tubular shaft 25 may be journalled in ball bearings, one 27 on the torsion head and the other 28 near the lower end of the shaft. The tubular shaft 26 carrying the cylinder 11 may similarly be journalled by two ball bearings 29 near the ends of that part of the shaft which is within the support 12.

One of the tubular shafts, conveniently that 26 carrying the cylinder 11, has a cross bar 31 and the other tubular shaft 25 a fork 32, the limbs of which lie in the path of the cross bar. Thus, the relative rotation of the two tubular shafts is, in any case, limited to a little less than 180°. Indeed, the parts can be shaped, as shown in Figure 5, to limit the relative rotation to a much smaller angle. The relative rotation is arranged to control the electric motor 14 which is carried in the casing 13 and which conveniently drives the torsion head 16 through worm gearing 34. A convenient type of motor is a D.C. motor having a permanent magnet field. Such a motor can be readily supplied from a storage battery.

The operation of the control should impose only very light loads and it would be possible to employ a variable capacitor, or to make use of an inductive effect. This would involve circuit complications, however, between the variable device and the motor. It is simpler and it is preferred therefore as shown to use contacts Mc on light springs 35, 36, carried respectively by the cross bar 31 and fork 32, the opening and closing of which involves only very small forces. Since the catching up of the torsion head 16 with the rotation of the cylinder 11 is determined by the fork 32 and cross bar 31 coming into contact the closing of the contacts must stop the motor and the opening of the contacts when the cylinder 11 runs away must start the motor, and the contacts cannot directly control the motor but must do this through a relay. This has the advantage that the current passing through the contacts is smaller.

This basic circuit is shown in Figure 7. The contacts Mc carried by the sprrings 35, 36 when closed cause energisation of the relay winding R. This closes the upper relay contact Rc1 thus disconnecting the motor 14 from the supply and short circuiting its armature. When the contacts Mc open, the relay is deenergised and the lower relay contact Rc2 is closed, thus connecting the motor 14 across the supply. The diagram also shows another contact Cc included in the viscometer which causes a counter C to be actuated, as will be described below. It will be understood that the dotted rectangle encloses those circuit components which must be within the viscosmeter while the remaining components may be at any convenient remote point.

Since entire switching off of the motor in the basic circuit of Figure 7 may lead to jerky operation, instead a resistance may be switched into the motor circuit, thus slowing it down instead of stopping it. This also helps to prevent the cylinder coming intermittently to a standstill, which could give misleading results with liquids that break down. The switching in of a resistance in this way is shown in Figure 8 which is described below.

To enable the rotations of the cylinder to be indicated and/or counted at a distance, the cross bar 31 also carries a trailing spring 37 on which is provided one of the contacts Cc of Figure 7 and which once per revolution touches the other contact Cc provided on a fixed screw 38 in the support 12. Connection to the contacts Cm and Cc is made by insulated wires to slip rings 39 at the upper end of the tubular shaft 25 against which bear brushes 41, the outer ends of which are accessible in the casing 13. The springs and contacts are insulated as necessary.

The wire 15 is held at both ends in such a way that it can easily be exchanged to enable the instrument to be used conveniently for a wide range of viscosities by using wires of different gauges. To this end the lower end of the wire is secured in a flanged sleeve 42, the flange being clamped to the bottom of the cylinder 11 by the end of the shaft 26 which screws in. To permit the necessary movements of the shaft it is a sliding fit in the upper end of the cylinder and packing rings 43 are provided here. At the other end the wire is secured in a sleeve which is clamped in the plug member 17 by two opposite radial set screws 44.

All the joints between the various separate parts of the cylinder 11, support 12 and casing 13 are made proof against the entry of liquid by washers of suitable material, or in the case of permanent joints with wax or synthetic resin. The shaft 26 carrying the cylinder must pass through a clearance hole in the lower end of the support 12, but since it is journalled in ball bearings which locate it very exactly the clearance can be kept down to a very small value through which the sort of liquids for which the viscometer is most useful will not flow. In this way the liquid is kept out of the interior of the support. Electric leads are taken out through the casing 13 by means of a multi-point liquid-tight connector 45 and plug.

Provision may also be made to ensure that after setting and immersion the cylinder 11 does not start rotating until a switch is operated and so that the timing or counting of the revolutions of the cylinder always starts from the commencement of rotation of the cylinder. This may be of particular importance in dealing with non-Newtonian liquids which break down rapidly. Figure 8 shows how this may be achieved. A "run"—"set" switch 47 is provided which in the "run" position connects the contacts Cc, as in Figure 7, to the electro-magnetic counter C and connects the contacts Mc, also as in Figure 7, to the relay A. In the "set" position however, the contacts Cm are disconnected from the counter and are connected to control the relay A, while the contacts Mc are taken out of circuit. The predetermined torsion of the wire 15 is applied to it through the plug member 17 with the viscometer in air and with the electrical supply switched off. The "run"—"set" switch is now put into the "set" position, a switch S to position 1, and the supply switched on. The motor 14 will now start and run until the contacts Cc close whereupon the relay A is energised and the motor 14 is stopped. The viscometer is now set and may be immersed. The "run"—"set" switch is now changed over to "run" position. This causes the motor 14 to start again but the viscous drag on the cylinder does not allow it to follow at the same speed and in a very short time the fork 32 and cross bar 31 close the contacts Mc, thus energising the relay A and stopping the motor 14 again. The cylinder 11 continues to rotate under the torque of the torsion wire 15 and after a short movement the contacts Mc open and the motor re-starts. This cycle repeats itself and the complete revolutions of the cylinder are recorded by the counter C which is energised through the contacts Cc. It will be observed that with this arrangement the revolutions of the cylinder 11 after immersion always start from the point at which the contacts Cc are closed.

As above mentioned switching the motor 14 on and off when the contacts Mc open and close may lead to jerky operation. By changing the switch S over to position 2 the motor 14 is connected to be controlled by the relay contact A2. In this position when the relay is energised, instead of the supply to the motor being cut off, the supply is maintained through a resistance $R_2$ which causes the motor to slow down. Another resistance $R_1$ is provided which when the relay is deenergised is shunted across the resistance $R_2$, thus causing the motor to speed up. The resistances $R_1$ and $R_2$ are adjustable so that the motor speed in the two positions of the contacts Mc can be regulated to suit the operating conditions. Instead of the two resistances being switched in this way, the contact A2 may be a change over contact which changes over from one resistance to the other with a similar result. Normally the use of the resistances will be required during the running of the viscometer, i.e. the switch S should be at position 2, while when the switch 47 is in the "set" position the motor must be connected so that it stops when the relay is energised, i.e. the switch S must be in position 1. If desired the switch S of the "run"—"set" switch may be coupled so that in the "set" position of the switch 47 the switch S is in position 1 while in the "run" position of the switch 47 the position of the switch S is at the option of the operator.

Desirably, there is a lamp Lc in parallel with the counter so that each time the contact Cc closes there is a flash, thus enabling the revolutions of the cylinder 11 to be followed visually and to be timed. These impulses may also be recorded or otherwise made use of. Depending on circumstances the interval between two successive impulses may be timed or the time be taken for a particular number of impulses, the latter being the more accurate if the timing is performed visually by an operator. The impulses can be used to effect direct and continuous control of some process or operation in which the viscosity of the liquid being measured is a factor which needs to be taken into account or needs to be kept at a particular value, the control in the latter case being exerted on some means such as a supply of heat or a diluent which can vary the viscosity in the required direction. In general the form of control exercised may be the rate of flow or concentration of a liquid (whether of the liquid the viscosity of which is being measured or of some other liquid) or of a temperature or any other factor affecting the process either before the point at which the viscosity is being measured or after, so as to tend to restore the viscosity to some datum value, or indeed the control may take effect at a later point in the process so as to take account of the viscosity of the liquid being measured in the further treatment leading to a final product.

There may also be a lamp Lm in parallel with the motor controlled by another relay contact A1, which shows when the motor is running and yet another lamp Ls across the supply to the apparatus which shows when the main supply is switched on.

It will be understood that the whole of the support 12 and casing 13, as well as the cylinder 11, may be immersed and by providing an upwardly extending rod in sections from the support, immersion to any desired depth can be obtained. If the viscometer is to be used in a tank of such large size that the body of liquid can be regarded as infinite without error nothing more is needed, but if the effects of the walls are likely to affect the measurement an outer stationary cylinder of known internal diameter can be associated with the rotating cylinder, the wall effect then being allowed for in known manner in the evaluation of viscosity.

The instrument can be calibrated by calculation in which case account must be taken of the viscous drag on the wall of the cylinder 11, on its ends, and on the shaft 26 driving the cylinder. With a cylinder of considerable length in relation to its diameter and with the shaft 26 of relatively small diameter, the drag on the wall of the cylinder preponderates by far; with the proportions illustrated, it can be shown that this part accounts for 91.5 percent of the total, the end effect for 7.0 percent and the shaft for 1.5 percent. Some correction is also necessary for bearing friction which is ascertainable by practical test. In any case, however, the actual calibration is best effected by trial in liquid of known viscosity for various settings of the torque applied to the wire 15. Then from the relationship viscosity=shearing stress/rate of shear the scale on the torsion head 16 seen through the window 22 can be calibrated in terms of shearing stress.

When used with inflammable liquids a supply of inert gas under pressure conveniently nitrogen may be led to the casing 13, through a flexible tube attached to a connection 48 whence it passes through the motor to the interior of the rest of the support 12. This minimises risks due to electric sparks and it also helps to prevent the ingress of liquid along the clearance between the tubular shaft 26 carrying the cylinder 11 and the lower end of the support 12. Indeed, similar provision may be made where there is no fire risk simply to prevent ingress of liquid.

The viscometer according to the invention can be used with such liquids as petroleum, crude oil, fuel oil, molasses and slurries of various kinds, all of which are liquids which it is difficult to sample and the viscosity of which is, in any case, liable to be changed by the mere action of sampling and removing the sample from the tank.

What we claim is:

1. A viscometer of the constant-torque, rotating-body type comprising a stationary support, a torsion head rotatably mounted therein, an immersion body, a torsion member connected between the immersion body and the torsion head, a motor for rotating the torsion head in a direction to increase the torque in the torsion member, a first tubular shaft carried by the torsion head surrounding the torsion member and extending towards the immersion body, a second tubular shaft carried by the immersion body surrounding the torsion member and extending towards the torsion head, a cross bar carried by one of the tubular shafts and a fork carried by the other tubular shaft with its limbs in the path of the cross bar, an electric contact carried by the cross bar and electric contact carried by the fork so placed that relative rotation between the cross bar and fork in one direction closes the contacts and in the other direction opens them, and electrical means controlled by the opening and closing of said contacts for increasing the speed of the motor when the immersion body lags behind the torsion head and for decreasing the speed of the motor when the immersion body leads on the torsion head.

2. A viscometer according to claim 1 in which the motor is an electric motor.

3. A viscometer according to claim 2 in which the electrical means includes a resistance switched in when the immersion body lags so that the motor does not tend to stop as a result of the immersion body lagging.

4. A viscometer according to claim 1 also including contacts closed at regular intervals of rotation of the immersion body and an electrically operated counter actuated by these contacts.

5. A viscometer according to claim 4 wherein said contacts closed at regular intervals comprise a trailing contact carried by the cross bar, and a fixed contact, cooperating with the trailing contact carried by the stationary support.

6. A viscometer according to claim 4 also including switching means are provided for putting the motor under the control of the counter-actuating contacts in such a way that the motor is stopped when these contacts are closed.

7. A viscometer according to claim 1 in which the immersion body is a cylinder of considerable length in relation to its diameter.

8. A viscometer according to claim 1 in which the torsion head includes a rotatable plug member in which the end of the torsion member is secured, and means for locking the plug to the torsion head.

9. A viscometer according to claim 8 in which the locking means includes a sleeve carried by the plug member extending over the torsion head, and a cursor sliding in an axial groove in the sleeve and engaging in a helical groove in the torsion head.

10. A viscometer according to claim 1 in which connections to the contacts are effected through brushes coacting with slip rings on the tubular shaft carried by the torsion head.

11. A viscometer according to claim 1 provided with means for supplying inert gas under pressure to the interior of the stationary support.

12. A viscometer according to claim 1 also including switching means which in one position cause the motor supply to be cut off when the immersion body lags and which in the other position cause the motor supply to be reduced when the immersion body lags.

References Cited in the file of this patent

UNITED STATES PATENTS 2,626,786     McGlothlin _____ Jan. 27, 1953

FOREIGN PATENTS 533,524     Germany _____ Sept. 15, 1931

OTHER REFERENCES

Journal of Scientific Instruments, C. A. R. Pearce, vol. 30, pps. 232–236, July 1953.